Figure 1:
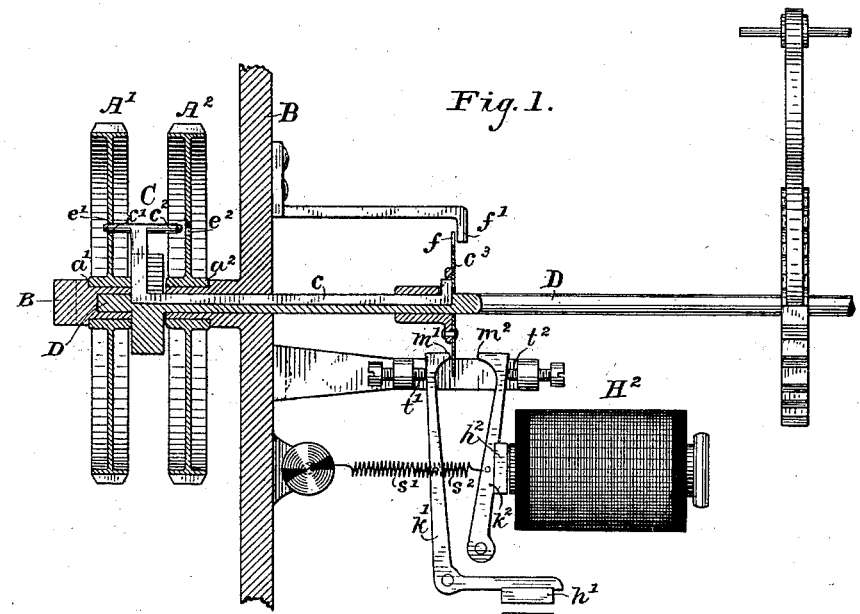

(No Model.)

H. VAN HOEVENBERGH.
PRINTING TELEGRAPH.

No. 316,678. Patented Apr. 28, 1885.

Witnesses
Wm A. Skinkle
H. W. Elmore

Inventor
Henry Van Hoevenbergh
By his Attorneys
Pope & Edgecomb

UNITED STATES PATENT OFFICE.

HENRY VAN HOEVENBERGH, OF ELIZABETH, NEW JERSEY, ASSIGNOR TO THE BALTIMORE & OHIO TELEGRAPH COMPANY, OF BALTIMORE, MD.

PRINTING-TELEGRAPH.

SPECIFICATION forming part of Letters Patent No. 316,678, dated April 28, 1885.

Application filed August 7, 1884. (No model.)

*To all whom it may concern:*

Be it known that I, HENRY VAN HOEVENBERGH, a citizen of the United States, residing in Elizabeth, in the county of Union and State of New Jersey, have invented certain new and useful Improvements in Type-Wheel-Shifting Devices for Printing-Telegraph Instruments, of which the following is a specification.

My invention relates to a class of printing-telegraph instruments in which two independently-movable type-wheels are employed for producing impressions.

The object of the invention is to provide convenient and reliable means for locking one or the other of the type-wheels to the revolving type-wheel shaft, accordingly as it is desired to effect impressions from one or from the other. The type-wheel which is thus locked is advanced by a step-by-step movement, communicated to the shaft in any convenient manner, while the remaining type-wheel stands at rest.

In carrying out my invention I employ a clutch consisting of a longitudinally-movable section of the type-wheel shaft, terminating in two pins, respectively extending toward the inner surfaces of the two parallel type-wheels. This clutch when in one position forces one of the pins into engagement with the corresponding type-wheel, at the same time releasing the other type-wheel. When the clutch is in the other of its two positions, the second type-wheel is engaged and the first type-wheel is released.

For the purpose of moving the clutch a shifting disk is secured to the end which is remote from the type-wheels. This disk is designed to occupy either of two positions, the one being upon one side of a guide-arm extending toward the type-wheel shaft, and the other position being upon the opposite side of this arm. At one point in the revolution of the shaft the slot formed in the disk is opposite the guide-arm, and the disk may be moved from one to the other of its positions, the arm passing through the slot. At other times, however, the disk is engaged by the arm and prevented from moving away from the position in which it was last placed, although free to revolve with the type-wheel shaft.

For the purpose of moving the disk, and thus changing the position of the clutch, when it is so desired, two electro-magnets are employed. These electro-magnets are each provided with an armature and armature-lever, respectively extending upon opposite sides of the disk. One of the electro-magnets is designed to be normally vitalized sufficiently to hold its armature-lever away from the disk. The other electro-magnet is designed to be vitalized only when it is desired to transfer the disk from one to the other of its positions. If this last-named electro-magnet be vitalized at the moment the slot is opposite the guide-arm projecting toward the shaft, its armature-lever will serve to force the disk longitudinally with reference to the type-wheel shaft, thereby transferring the clutch from engagement with one type-wheel into engagement with the other. When, on the other hand, it is desired to re-transfer the disk to its first position, it is necessary only to demagnetize the second electro-magnet—that is to say, the one which is normally vitalized—at the moment the slot is opposite the guide-arm. The retractile force applied to the lever of this electro-magnet will thereupon move the clutch longitudinally in the proper direction to cause the first-named type-wheel to be again engaged.

Figure 2:
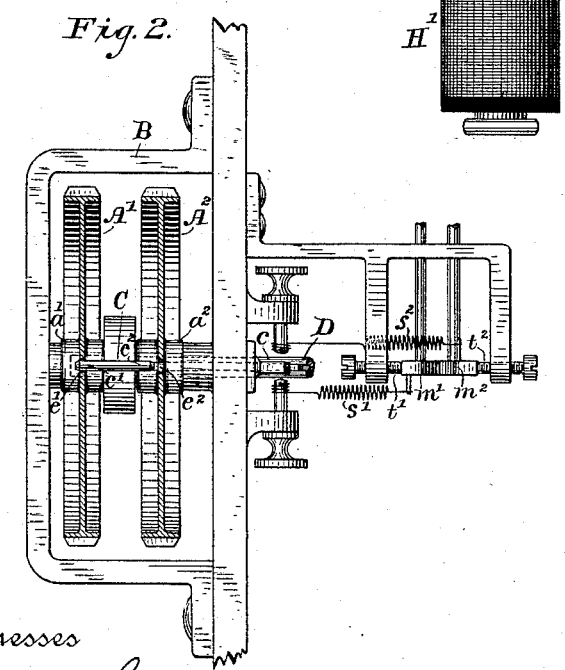
Figure 3:
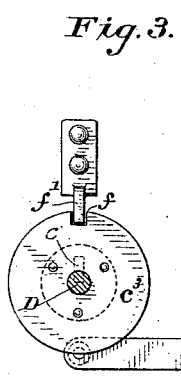

In the accompanying drawings, Figure 1 is a side elevation of such portions of a printing-telegraph instrument as are necessary to illustrate my invention, and Fig. 2 is a plan view of the type-wheels and a portion of the clutch mechanism. Fig. 3 illustrates certain details in the construction of the shifting disk.

Referring to the figures, A' and A$^2$ represent two type-wheels, which are respectively mounted upon suitable supporting-sleeves, a' and a$^2$, which are carried upon the frame B of the instrument. Between these two type-wheels extends the extremity of a clutch, C, which is designed to engage one or the other of two type-wheels, according to its position. This clutch consists of a bar, c, which is let into the type-wheel shaft D, and of two pins, c' and c$^2$, which are respectively designed to enter apertures e' and e$^2$, formed in the type-wheels A' and A$^2$, respectively. At the entremity of the bar c opposite the pins c' and c$^2$ there is carried a shifting disk, c$^3$, by means of which the clutch is moved longitudinally in the shaft D. In the periphery of the disk $c^3$ there is formed a slot, $f$, which is designed to permit the disk to be moved longitudinally, provided it is in such position that the slot is opposite the extremity of an arm, $f'$, rigidly secured to the frame B and projecting toward the type-wheel shaft D. At other points in the revolution of the disk, however, the arm $f$ prevents the disk, and thus the clutch C, from being moved upon the shaft.

For the purpose of operating the clutch, two electro-magnets, H' and H², are employed. The electro-magnet H' is provided with an armature, $h'$, carried upon a lever, $k'$. The lever $k'$ carries at its extremity a point, $m'$, which projects beyond the periphery of the disk $c^3$. If the electro-magnet be vitalized when the disk is in the position shown in Fig. 1, the point $m'$ will press against the disk and will force the same longitudinally upon the shaft D, thus moving it to the right-hand side of the arm $f'$. This movement of the disk, however, can occur only when the slot $f$ is opposite the extremity of the arm $f'$. The second electro-magnet, H², is constructed so that it will be normally vitalized sufficiently to hold its armature-lever $k^2$ in its forward position, as shown in Fig. 1. When, however, the electro-magnet is demagnetized, either by a decrease in the strength of the current or an interruption of the same, the armature $h^2$ will be released and the point $m^2$, which is carried at the extremity of the lever, will rest against the disk $c^3$. If the disk should be in its second position—that is to say, upon the right-hand side of the arm $f'$—when the electro-magnet H² is demagnetized, the slot $f$ being in line with the arm, then the pressure of the point $m^2$ will cause the disk, and thus the clutch C, to move longitudinally toward the left hand. In this manner it will be understood that the two movements of the clutch may be secured—the one by increasing the strength of current traversing the coils of the electro-magnet H', and the other by decreasing the current traversing the coils of the electro-magnet H². These two electro-magnets are preferably included in the circuit of the main-line conductor, which also traverses the escapement and the printing magnets. The currents, however, which are normally employed for operating the escapement are of sufficient strength, even although they may be of alternating polarity, to vitalize the electro-magnet H²; but they are insufficient to vitalize the electro-magnet H'. The electro-magnet H' may, however, be constructed to respond to a prolongation of any one of the impulses employed for actuating the escapement, and it may be so constructed with reference to the electro-magnet employed for printing that the currents which serve to vitalize the latter will also vitalize the electro-magnet H', for it will be understood that, even if the electro-magnet H' be vitalized each time an impression is effected, no movement of the clutch may be produced unless the type-wheel which is being employed is in such position that the slot $f$ of the disk $c^3$ is in such position as to permit a transfer of the clutch. The movements of the clutch which are thus obtained serve to cause one or the other of the type-wheels to be actuated by forcing the pin $c'$ or $c^2$ into the corresponding aperture, $e'$ or $e^2$, formed in the type-wheels A' and A², respectively. Thus, while the clutch is in the position shown in the drawings, the type-wheel A' is engaged, while the type-wheel A² is permitted to stand at rest. When, however, the clutch is transferred by the action of the electro-magnet H', the type-wheel A' will be released and the type-wheel A² will be engaged. In either case one type-wheel will be revolved, while the other remains in the position in which it stood when released, and will be actuated again only when the clutch is transferred. Suitable adjustable retractile springs, $s'$ and $s^2$, are applied to the armature-levers $k'$ and $k^2$, and limiting-stops $t'$ and $t^2$ are also respectively applied to these levers.

Any convenient form of unison device may be applied to the shaft D for the purpose of insuring that the type-wheel which is at any time being actuated may be arrested in the proper position to transfer the clutch.

I claim as my invention—

1. The combination, substantially as hereinbefore set forth, with two type-wheels and a clutch for locking one or the other of said type-wheels, of two electro-magnets, the one of which is normally inactive, while the other is normally active, and means, substantially such as described, whereby said clutch is actuated in one direction by the first-named electro-magnet when it is rendered active, and in the opposite direction by the second-named electro-magnet when it is demagnetized.

2. The combination, substantially as hereinbefore set forth, of two independently-movable type-wheels, a type-wheel shaft, a clutch for locking one or the other of said type-wheels to said shaft, two electro-magnets for controlling the movements of said clutch, and their respective armatures and armature-levers, one of which levers actuates said clutch when its electro-magnet is rendered active, and the other of which levers causes said clutch to be actuated when its electro-magnet is demagnetized.

3. The combination, substantially as hereinbefore set forth, with two type-wheels, a type-wheel shaft, and a clutch for locking one or the other of said type-wheels to said shaft, of two electro-magnets and their respective armatures and armature-levers, one of which levers serves to impel said clutch in one direction, and the other in the opposite direction, substantially as described.

4. The combination, substantially as hereinbefore set forth, of two type-wheels, a clutch for locking one or the other of said type-wheels, which clutch consists of a bar longitudinally movable with reference to the axis of said type-wheels, a disk carried upon one extremity of said bar, and clutch-pins carried upon the other extremity of the same for engaging one or the other of said type-wheels, and two electro-magnets, their armatures, and armature-levers, which levers engage said disk, substantially as described.

5. The combination, substantially as hereinbefore set forth, of two type-wheels, a clutch for engaging one or the other of said type-wheels, a disk revolving with said type-wheels, two electro-magnets, their armatures and armature-levers, which levers respectively extend upon opposite sides of said disk, and means, substantially such as described, for causing one or the other of said armature-levers to actuate said disk at will.

6. The combination, substantially as hereinbefore set forth, of two independently-movable type-wheels, a clutch for engaging one or the other type-wheel, a type-wheel shaft for revolving said clutch, a disk secured to and revolving with said clutch, and having a slot or opening formed in its periphery, two electro-magnets, their armatures and armature-levers for controlling the operation of said clutch through said disk, and a guide-arm engaging said disk, and serving to prevent said clutch from being actuated except when it is in a given position.

7. The combination, substantially as hereinbefore set forth, in a printing-telegraph instrument, with the type-wheels A' and A², of the clutch C, having the engaging pins $c'$ and $c^2$, the disk $c^3$, secured to said clutch, the type-wheel shaft D, in which said clutch is carried, and the electro-magnets H' and H² and their armature-levers $k'$ and $k^2$, for controlling the movements of said clutch, substantially as described.

In testimony whereof I have hereunto subscribed my name this 26th day of June, A. D. 1884.

HENRY VAN HOEVENBERGH. [L. S.]

Witnesses:
DANL. W. EDGECOMB,
CHARLES A. TERRY.